G. P. YEAKEL.
SHEARS OR SCISSORS.
APPLICATION FILED FEB. 5, 1915.
1,200,567.
Patented Oct. 10, 1916.
2 SHEETS—SHEET 1.
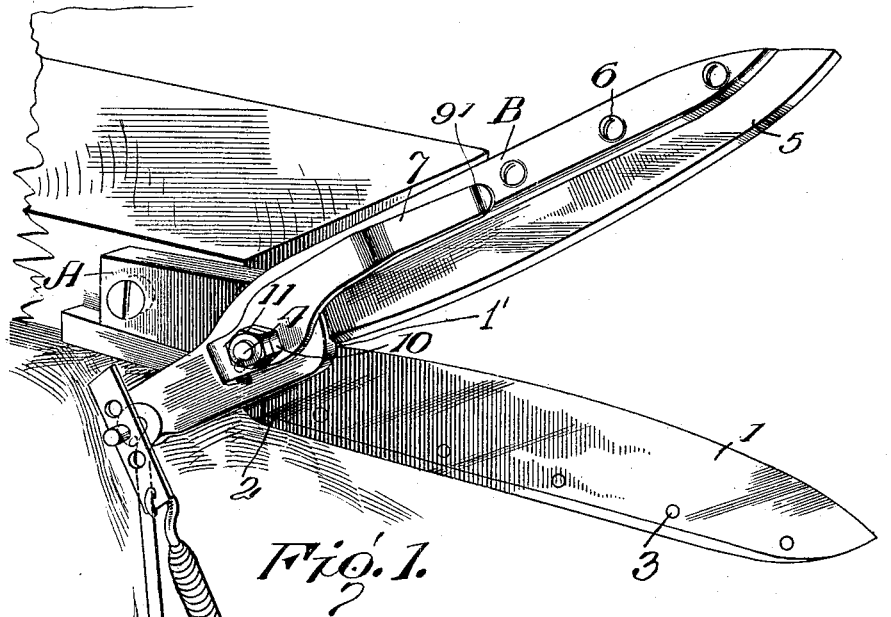
Fig. 1.
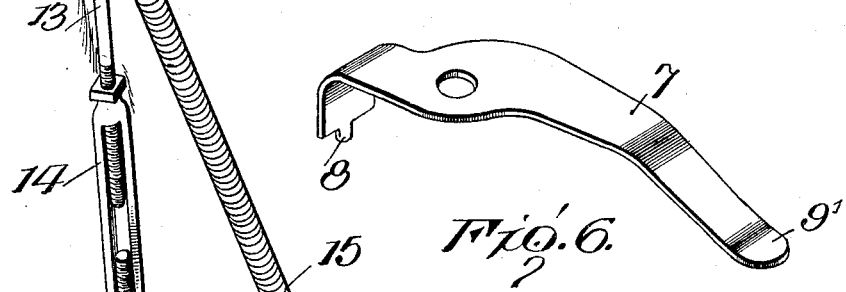
Fig. 6.
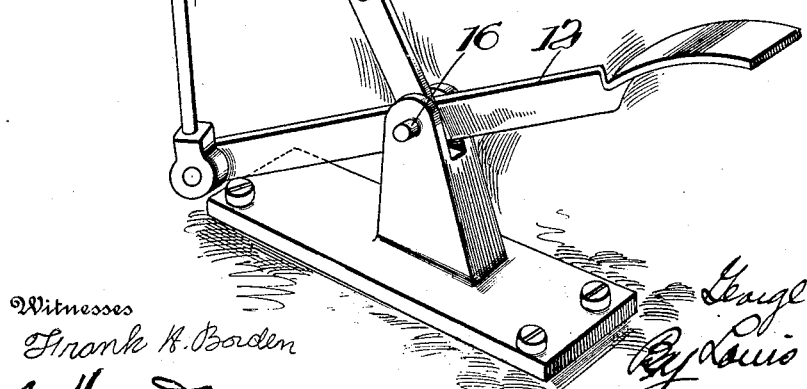
Witnesses
Frank K. Borden
A. A. Hammond
Inventor
George P. Yeakel
By Louis Bagger & Co.
his Attorneys
THE NORRIS PETERS CO., PHOTO-LITHO., WASHINGTON, D. C.

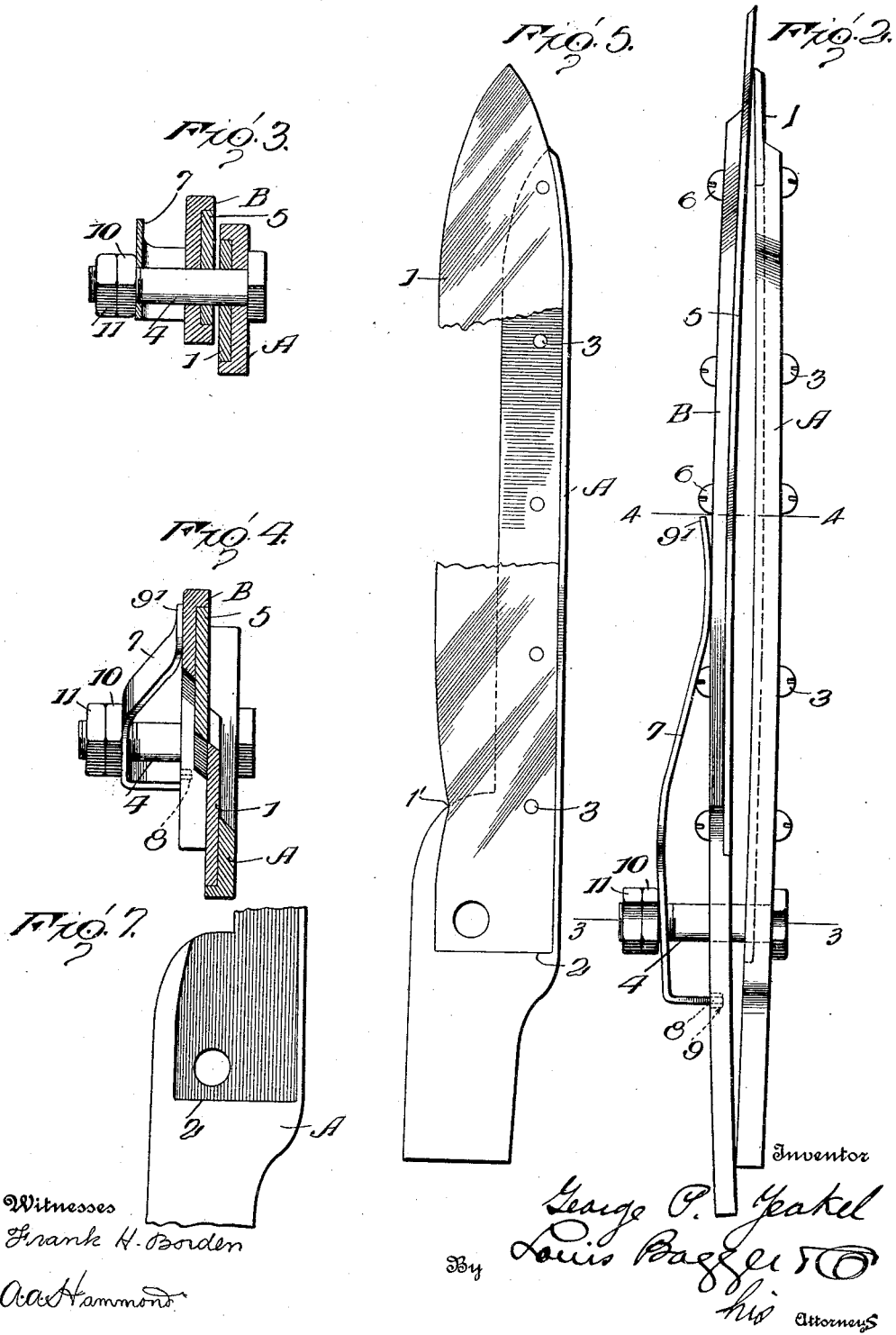

UNITED STATES PATENT OFFICE.

GEORGE P. YEAKEL, OF NORRISTOWN, PENNSYLVANIA.

SHEARS OR SCISSORS.

1,200,567.  Specification of Letters Patent.  Patented Oct. 10, 1916.

Application filed February 5, 1915. Serial No. 6,241.

*To all whom it may concern:*

Be it known that I, GEORGE P. YEAKEL, a citizen of the United States, residing at Norristown, in the county of Montgomery and State of Pennsylvania, have invented certain new and useful Improvements in Shears or Scissors, of which the following is a specification.

My invention relates to an improvement in shears or scissors, and the object is to provide shears or scissors practically adapted for cutting several thicknesses of fabric, as is done, for instance, in the manufacture of underwear.

One accomplishment of these shears is a provision whereby the cut commences at the heel and continues throughout the length of the blade, this being accomplished by the peculiar construction of my improved shears or scissors.

Another object is to provide means for applying the required lateral pressure throughout the length of the blades, so that the blades cut with comparative uniformity throughout their entire length.

With these several objects in view, my invention comprises two blades eccentrically pivoted together.

My invention further consists in two blades pivotally connected together, said blades bowed whereby to afford the required cross, and a spring connected therewith at one end bearing at or near the center of one blade, the tension of which spring increases as the cutting is toward the end of the shears, due to the bowing apart of the blades between extreme ends.

My invention yet further consists in a pair of curved frames eccentrically pivoted together, blades removably and interchangeably secured to the frames, a stud secured to one frame, upon which the other frame is pivoted, and a spring held on the stud with its free end bearing laterally upon the frame at a point more or less midway between the ends of the blade, whereby lateral support is provided for the latter, and the tension of the spring is increased as the cutting advances toward the free ends of the blades.

In the accompanying drawings:—Figure 1 is a view in perspective of my improved shears or scissors, showing the blades open; Fig. 2 is an edge view, showing the blades together; Fig. 3 is a transverse section through the stud, on the line 3—3 of Fig. 2; Fig. 4 is a similar sectional view at or near the center, on the line 4—4 of Fig. 2, looking backward toward the pivot, and showing the shears partly open; Fig. 5 is a detached inside view of one of the frames, showing the blade therein partly broken away; Fig. 6 is a detached view of the spring; and Fig. 7 is a fragmentary view showing the socket in which the inner end of the blade is rabbeted.

A, represents a blade-frame. This is bolted horizontally to a suitable support, and the numeral 1 indicates a blade, the heel of which is rabbeted in the frame, as shown at 2, and the cutting edge of which has a curvature formed like the blade of an ordinary pocket-knife, starting at the heel or point 1' where it leaves the frame, and gradually curving out until it reaches the center, after which it curves reversely to the point, the intermediate portion preferably somewhere near approximating a straight line. The frame is bowed throughout its length, and the blade when fastened in the frame by the bolts 3, 3, is correspondingly bowed to give the required cross to the shears or scissors.

A stud 4 is preferably secured on the blade-frame A, extending through the heel of the blade eccentrically and nearly in line with the cutting edge of the blade. The blade and frame being thus secured together, and the stud extending through both, it gives added strength to the parts, each one reinforcing the other.

B, represents the pivoted frame, it being pivotally mounted on the stud eccentrically, or nearly in line with the curved cutting edge of the blade. This frame is bowed, as is the frame A, and the blade 5 is secured thereto by bolts 6, 6, similarly as with the other blade.

A spring 7 is mounted on the stud, and the short end is secured to the frame B in any approved manner, as for instance by a lug 8 entering a depression 9 in the frame. The free or opposite end 9' of this spring bears on the frame B at a point about midway the length of the frame B secured thereto. The tension of the spring is governed by the nut 10 turned on the threaded outer end of the stud 4. A lock-nut 11 holds the nut 10 in place.

By reason of the eccentric pivoting of the blades, they are at an angle to cut as high as eight thicknesses of underwear all the way from the heel of the blades to the opposite ends; or in other words, throughout the entire length of the blades. Consequently their length should approximately correspond with the cut to be made.

By directing the pressure of the spring at at a point approximately midway between the ends of the frame B, the tension increases toward the outer end of the shears, due to the bowing of the blades, which bowing causes a back pressure upon the spring, and a corresponding increase in its tension.

Any approved means might be employed for operating these shears, for instance a treadle 12 pivoted at the floor and connected by a rod 13 to the frame B, a turn-buckle 14 being provided in the rod for regulating the extent of movement of the frame B with its blade 5, and a spiral spring 15 extending from the pivot-point 16 of the treadle to the frame B normally returns the pivoted frame B to its raised position, as shown in Fig. 1.

With my improved shears, I am enabled to cut as high as twice the number of layers of fabric that have hitherto been cut, and by pivoting the blades together eccentrically, or nearly in alinement with their cutting edges, and in connection therewith, slightly curving outwardly the cutting edges of the blades, the shears commence to cut at the heel, as shown in Fig. 1, or at the angle when the shears are in the position shown in Fig. 1, and this is done without squeezing or forcing the different layers away from the shears, which cross in instances where the angle at the cutting point is too great.

In other words, my shears take hold at the heel without forcing the layers apart; and shears of this construction will cut as many layers of material as required, and more than have hitherto ever been cut.

I claim:

1. Shears or scissors comprising two blades, pivotally connected to each other at a point between the longitudinal center and the cutting edge, the cutting edges of the blades starting at the heel with an outward curve, whereby the entire cutting edges of the blades are progressively utilized in the cutting operation.

2. Shears or scissors comprising two bowed blades, pivotally connected to each other at a point between the longitudinal center and the cutting edge, means for forcing the blades shearingly toward each other with spring pressure, the cutting edges of the blades starting at the heel with an outward curve whereby the entire cutting edges of the blades are progressively utilized in the cutting operation.

3. Shears or scissors comprising two rigid bowed frames pivotally connected together at one side of the longitudinal center of the frame, blades secured to and bowed by said frames, the inner or cutting edges of said blades curving outwardly from each end toward the center, this curve starting near the pivotal point of the two frames, whereby the angle formed by the cutting edges of the blades at the heel or commencement of the curvature is sufficiently acute to insure cutting whatever comes between the blades from this point progressively throughout the length of the blades.

4. Shears or scissors comprising two rigid bowed frames pivotally connected together at one side of the longitudinal center of the frame, blades secured to and bowed by said frames, the inner or cutting edges of said blades curving outwardly from each end toward the center, this curve starting near the pivotal point of the two frames, whereby the angle formed by the cutting edges of the blades at the heel or commencement of the curvature is sufficiently acute to insure cutting whatever comes between the blades from this point progressively throughout the length of the blades, and means for exerting spring pressure of the two frames toward each other.

In testimony whereof I affix my signature in the presence of two witnesses.

GEORGE P. YEAKEL.

Witnesses:
 GILBERT R. NORR,
 MARY L. DRESHMAN.

Copies of this patent may be obtained for five cents each, by addressing the "Commissioner of Patents, Washington, D. C."